Aug. 19, 1958    R. PRICE ET AL    2,847,893
ADJUSTABLE THICKNESS FASTENER HAVING SCREW
OPERABLE BALL DETENTS
Filed Oct. 8, 1956

RUDOLPH PRICE
DONALD A. BROWN
    INVENTOR.

BY  *Duane C. Bowen*

United States Patent Office 2,847,893
Patented Aug. 19, 1958

2,847,893

ADJUSTABLE THICKNESS FASTENER HAVING SCREW OPERABLE BALL DETENTS

Rudolph Price and Donald A. Brown, Wichita, Kans., assignors to Boeing Airplane Company, Wichita, Kans., a corporation of Delaware Application October 8, 1956, Serial No. 614,478

2 Claims. (Cl. 85—5)

Our invention relates to an adjustable length blind fastener, quick release work holder or the like. The preferred structure includes an elongated slotted hollow shank, an inner threaded screw, and traveler members in the form of balls engaged with the screw threads and slidable in the slots. Members to be secured have aligned openings in which said shank is positioned and are clamped between the traveler members and a head on one end of said shank upon rotation of the screw. Operating means is provided to advance the screw and is engageable with a ratchet on the head to secure the screw in adjusted position.

In working with fabricated parts, particularly metal sheets, angles and the like, it is desirable to have means for temporarily securing a plurality of the parts together. These are commonly referred to as quick release work holders. In more permanent installations, it is often necessary to use blind fasteners when the worker cannot gain access to the rear side of a plate or the like being secured in position.

The objectives of our invention include: to provide an improved fastener adaptable as a quick release work holder or as a blind fastener; to devise the fastener with an adjustable length so that members of various widths can be secured thereon; and to provide improved ease and efficiency of operation and economy of manufacture in such a fastener.

Our invention will be best understood, together with additional advantages and objectives thereof, from a reading of the following description, read with reference to the drawings in which.

Figure 1:
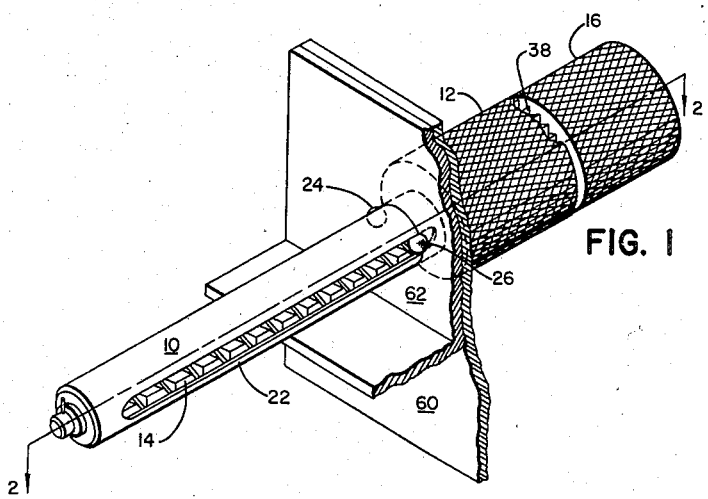
Figure 1 is a perspective view of a specific embodiment of our fastener together with a fragmentary view of two members being secured by the fastener.
Figure 2:
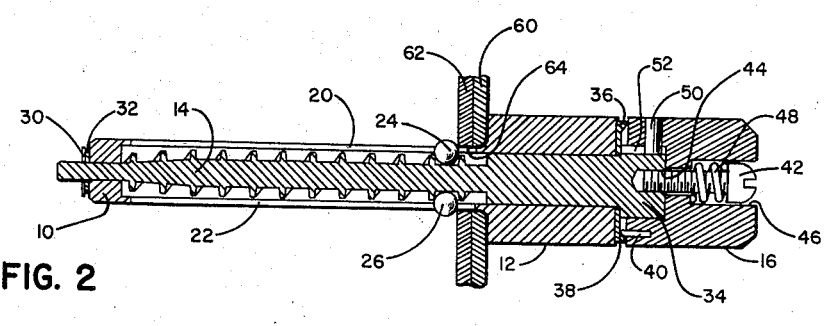
Figure 2 is a view, principally in section, taken on line 2—2 of Figure 1.

The principal parts of our fastener in the specific embodiment shown are a hollow shank 10, a head 12 fixedly secured to one end of shank 10, an internal threaded screw core 14 rotatedly mounted in shank 10 and head 12, and a knurled operating knob 16 connected to screw 14. Shank 10 has elongated slots 20, 22 and a pair of ball traveler members 24, 26 are mounted in the slots and are advanced toward and away from head 12 upon rotation of screw 14 to clamp members therebetween. Screw 14 is preferably double threaded as shown in the drawing so that the balls may travel together. Balls 24, 26 have segments extending out of slots 20, 22 acting as abutments. The balls are in clamping position throughout the major part of their travel in the slots whereby the fastener has an adjustable effective length for securing work pieces of various thicknesses.

Screw 14 is secured at one end by a pin 30 abutting a washer 32 at one end of shank 10. Screw 14 has an increased diameter portion 34 at the other end, the inner edge of which abuts against a ratchet disc 36 secured to one end of head 12. Ratchet disc 36 has one-way ratchet teeth 38 which are engaged by a detent 40 on operating knob 16. Knob 16 is secured to screw 14 by a screw 42 threaded into an opening 44 in screw 14. The head of screw 42 is countersunk in an opening 46 in knob 16 and a compression spring 48 is disposed under the head whereby the knob may be pulled away from head 12 to disengage detent 40 from ratchet teeth 38. The ratchet teeth are directed to permit rotation of knob 16 to move balls 24, 26 toward head 12, and knob 16 is pulled to disengage the ratchet for retracting the balls. A pin 50 in the side of knob 16 fits in a groove 52 in increased screw diameter portion 34 to prevent relative rotation therebetween.

Figure 3:
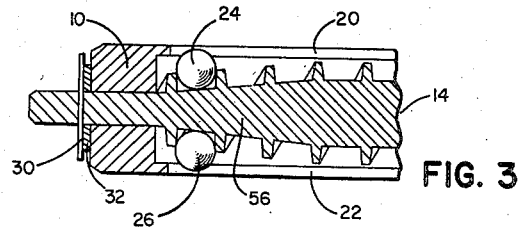
Figure 3 is an enlarged fragmentary view, principally in section, of the distal end of the fastener.

Screw 14 has a reduced diameter threaded portion 56 near the distal end of slots 20, 22 so that balls 24, 26 may move to an inner position to pass the walls of the openings in which shank 10 is positioned. It will be observed that this fastener may be operated blind as balls 24, 26 can automatically assume the positions shown in Figure 3 upon rotation of knob 16. The fastener acts as a quick release work holder as simple disengagement of the detent from the ratchet and reverse rotation of the knob quickly achieves release of secured members.

Figure 1 shows a typical application in which a plate 60 is secured to an angle 62 by a fastener positioned in aligned openings 64 in plate 60 and angle 62. Balls 24, 26 broadly comprise travelers having inner thread engaging portions and outer abutment portions and other forms of travelers may be substituted. The travelers might be secured in place by friction depending on the pitch of the screw threads, tolerances and the materials used, but the use of the positive ratchet locking is preferred. The tolerances of positioning between the travelers and the shank head depend on the number of ratchet teeth. Broadly, the parts include a slotted hollow shank, an inner core, and travelers having threaded engagement with one and sliding engagement with the other and having abutment means extending through the slots and exposed to the outside of the shank. It is preferable to have the abutments automatically retracted to an inner position at the distal end of the shank so that the walls of the openings in which the shank is positioned will pass the abutments without need for access and manual disengagement or the like.

Having thus disclosed our invention, we do not wish to be limited to the precise construction as shown, but instead wish to cover those modifications thereof which will occur to those skilled in the art from our disclosure, and which fairly fall within the scope of our invention, as defined in the appended claims.

We claim:

1. An adjustable length fastener to be positioned in aligned openings of a plurality of members to be secured together, comprising: an elongated hollow shank and a fixed head secured to an end thereof, an inner screw rotatably mounted in said shank and secured against movement longitudinally of said shank, an operating member mounted on said head and connected to said screw and operable to rotate the same, said shank having a plurality of elongated longitudinal slots and a ball slidably mounted in each slot and being larger in diameter than the width of the slot and having its major portion inside of the outer surface of said shank, whereby the ball is retained in the slot, said screw having double threads and each ball having an inner portion engaged in the threads of said screw, whereby the balls are together advanced toward and retracted from said head upon rotation of said screw by said operating member, each ball having an outer segment protruding outwardly from the surface of said shank during travel of said balls in said slots toward said head in the area of the shank where said plurality of members to be secured are located to clamp the same, said screw having a reduced diameter portion at its end portion opposite said head permitting inward retraction of said balls so that said outer segments are movable inwardly a sufficient distance to pass through said aligned openings.

2. The subject matter of claim 1 in which said operating member is a manually rotatable knob mounted coaxially on the opposite side of said head from said shank and making connection with said screw, said knob and head having one way ratchet locking means therebetween for securing said screw in adjusted position, and said knob being spring mounted relative said head whereby said ratchet locking means may be disengaged for releasing and reversal of said screw.

References Cited in the file of this patent

UNITED STATES PATENTS

| | | |
|---|---|---|
| 496,379 | Briggs | Apr. 25, 1893 |
| 2,373,083 | Brewster | Apr. 3, 1945 |
| 2,404,169 | Gidden | July 16, 1946 |
| 2,609,723 | Stubbs | Sept. 9, 1952 |